United States Patent

[11] 3,624,488

[72] Inventor Eugene W. Rabut
Shelby Township, Macomb County, Mich.
[21] Appl. No. 88,343
[22] Filed Nov. 10, 1970
[45] Patented Nov. 30, 1971
[73] Assignee The Udylite Corporation
Warren, Mich.

[54] INTERPHASE TRANSFORMER CONFIGURATION
18 Claims, 8 Drawing Figs.
[52] U.S. Cl. .................................................. 321/26, 321/8 C
[51] Int. Cl. ...................................................... H02m 7/00
[50] Field of Search ........................................... 321/8, 26, 8 C

[56] References Cited
UNITED STATES PATENTS
3,289,068 11/1966 Healis........................... 321/8
3,513,377 5/1970 Koltuniak et al. ............ 321/26

Primary Examiner—William M. Shoop, Jr.
Attorney—Harness, Dickey & Pierce

ABSTRACT: A rectifier system which includes a plurality of diodes in the secondary circuit thereof to provide rectification for the energy flowing from a main transformer connected to the source of alternating current power, the configuration including a plurality of parallel diodes in each phase to increase the current-carrying capabilities and an interphase transformer interconnected with each set of phase diodes, the interphase transformers being physically stacked in the rectifier assembly to facilitate the increasing of the number of paralleled diodes and thus the number of paralleled interphase transformers. The interphase transformers are stacked within two channels, the channels being bolted together to squeeze the cores of the interphase transformers. A common conductor is electrically connected, as by welding, to a center portion of the interphase transformer turns, the common conductor providing a common output conductor for all of the center taps of the interphase winding.

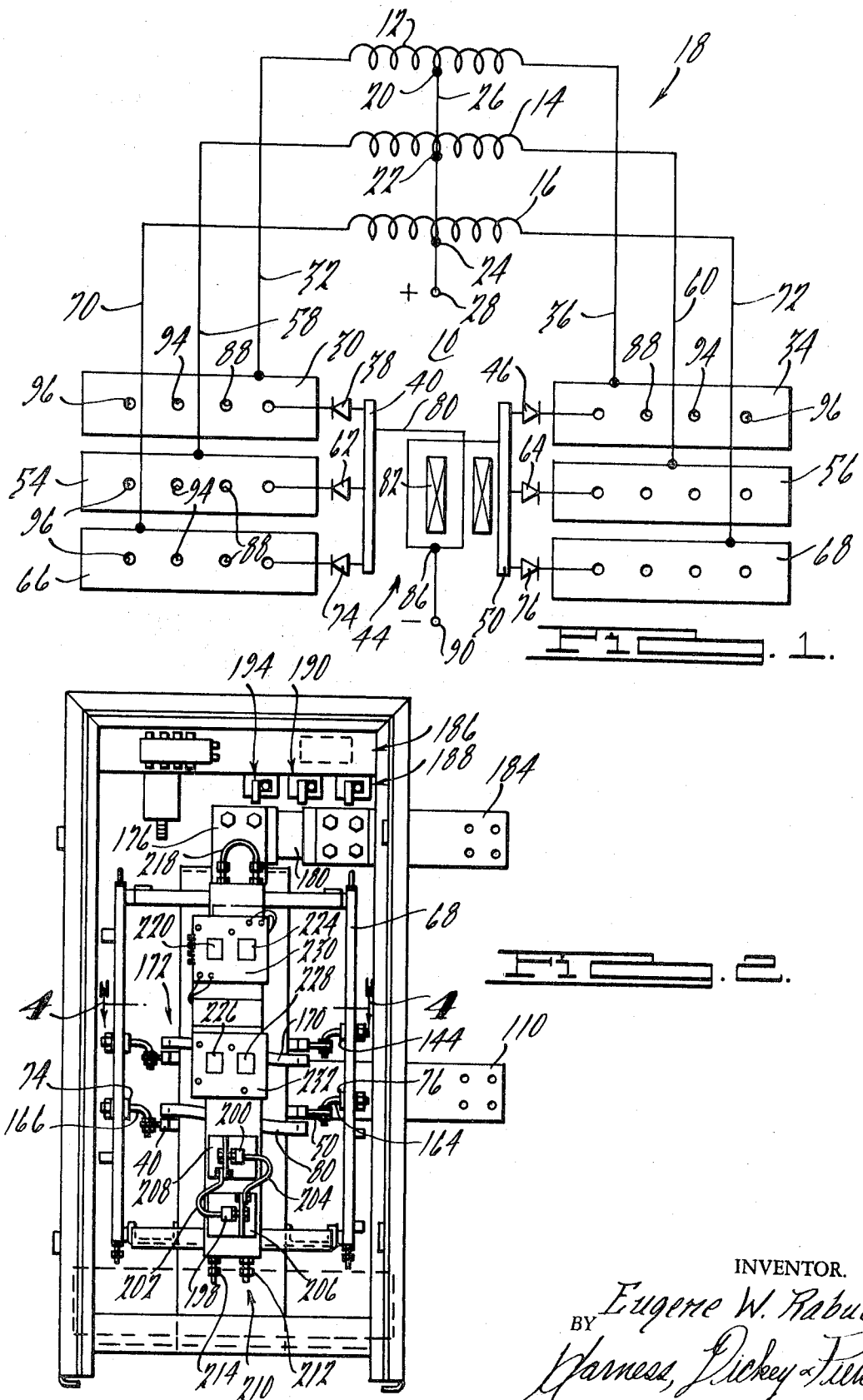

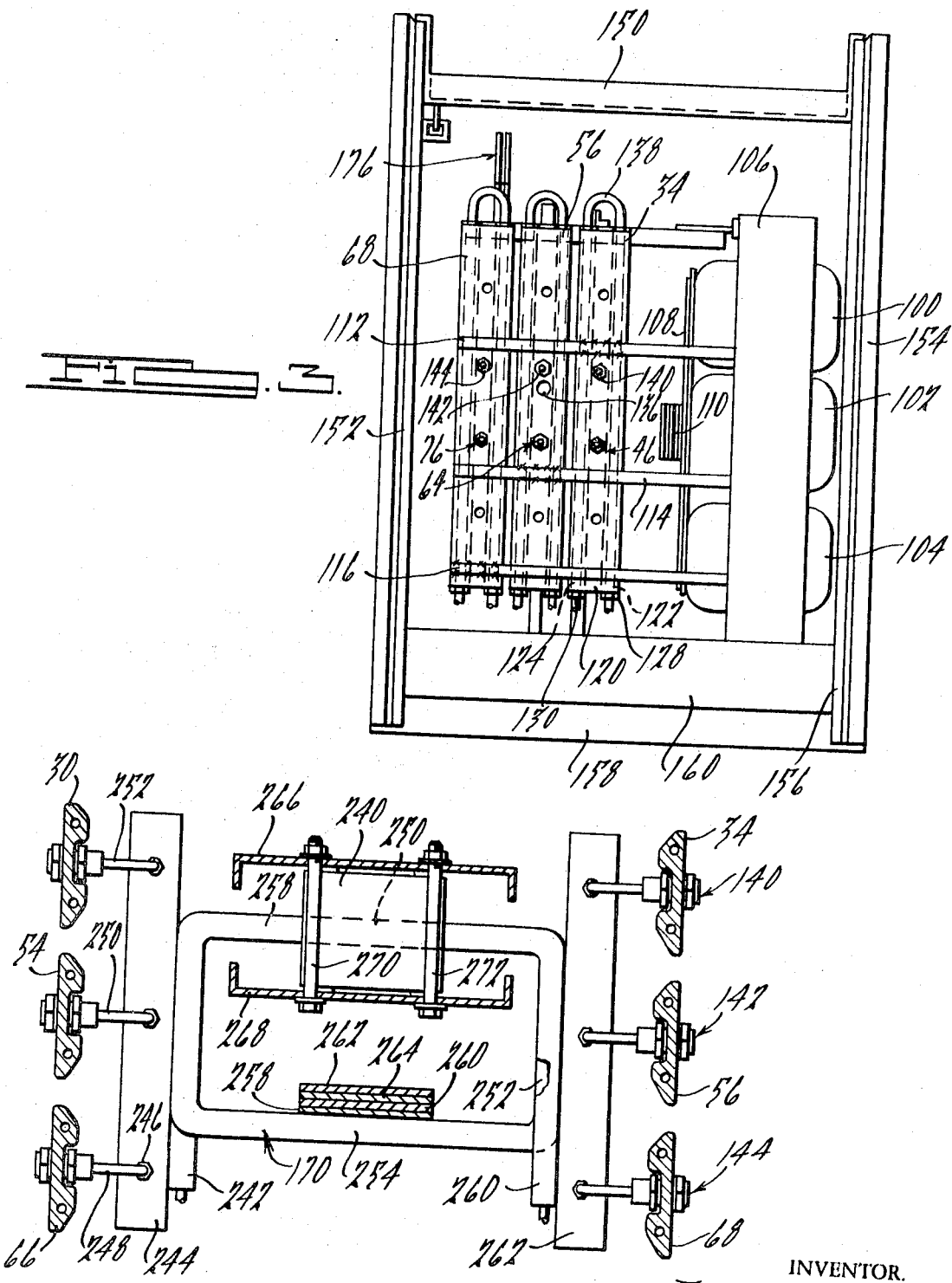

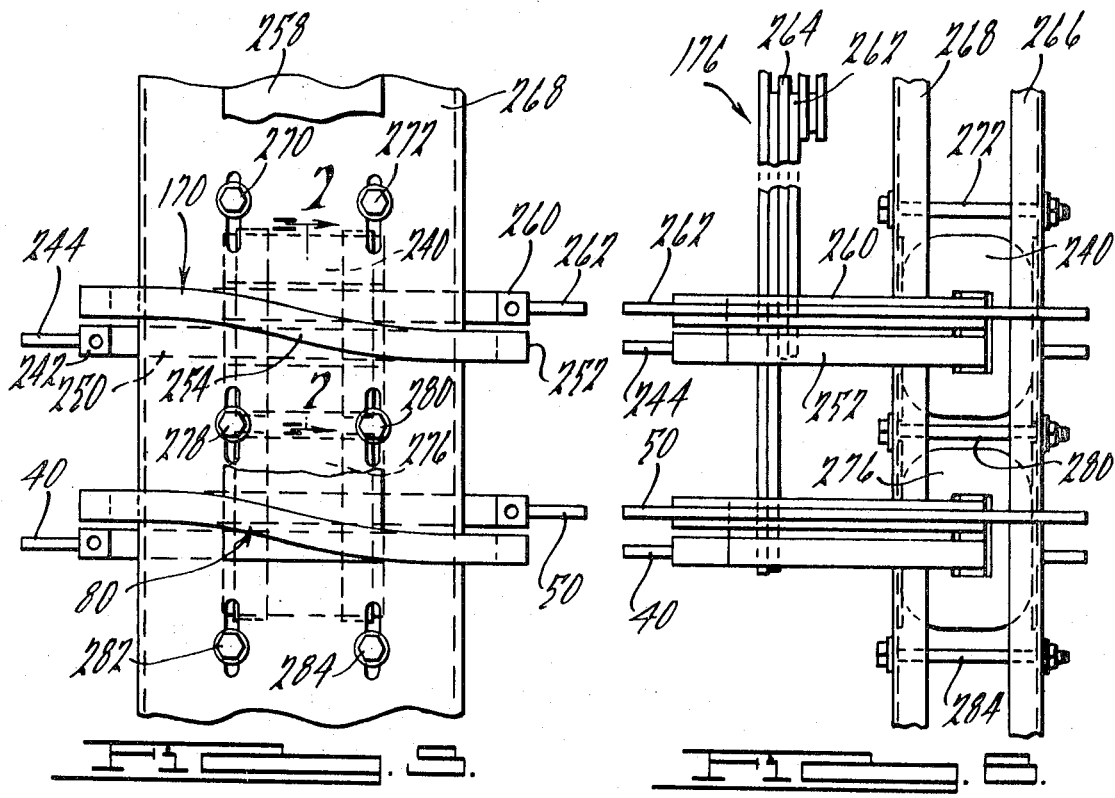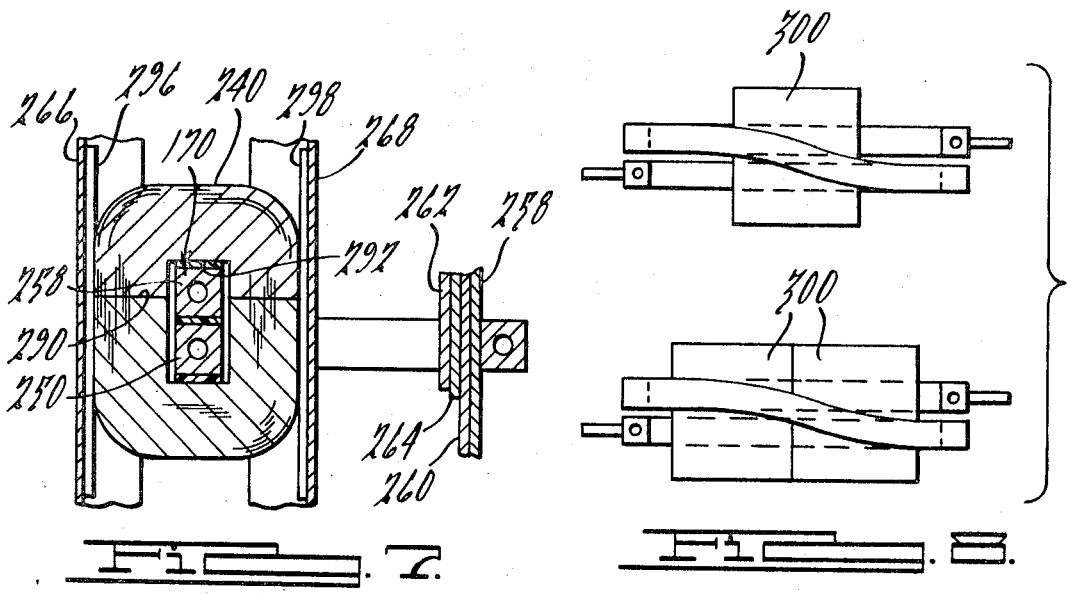

3,624,488

INTERPHASE TRANSFORMER CONFIGURATION

The purpose of the foregoing abstract is to enable the U.S. Pat. Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND AND SUMMARY OF THE DISCLOSURE

This invention relates generally to a configuration for a rectifier assembly and, more particularly, to a system for supporting the interphase transformers utilized in a rectifier system and for providing interconnections between the rectifying diodes and the interphase transformers, the system also including a provision for expanding the interphase transformer and rectifier diodes into a parallel combination.

As is well known, rectifier systems for use, particularly in, inter alia, electrochemical processes such as electrochemical plating and anodizing, require a large range of current ratings to accommodate the requirements of relatively small units, such as are used in precious metal plating, to extremely large units of the 10 to 20,000 ampere range. Particularly, in the larger units, it has been found necessary to provide diode paralleling in the output circuit to permit the increased current rating without the necessity of utilizing extremely high current-rated rectifier devices. Such a parallel diode system is illustrated in U.S. Pat. No. 3,513,377 issued May 19, 1970, for Individual Interphase Transformers.

In referring to that patent, it will be noted that a necessity has arisen, for circuit balance and other considerations, to provide interphase transformers at the output terminal of the paralleled diodes. The interphase transformer typically consists of magnetic core and a relatively large conductor having a few turns, for example, one or two turns.

In prior systems which provided parallel diodes and interconnected interphase transformers, a problem has arisen in supporting the cores for the paralleled interphase transformers and in bussing the winding associated with the transformer. Further, with changes in voltage within the rectifier system, it is necessary to provide cores and coils of different electrical characteristics to accommodate the difference in voltages from one family of rectifier ratings to another. Thus, an inventory of various sizes of conductors and cores is necessary.

Further, in systems utilized in the past, it was the practice to bolt the various elements together both for support of the various elements and to provide electrical connections between the center taps of the paralleled interphase transformers and the output diodes and for the transformer interconnections. This bolting arrangement created nonuniform resistance characteristics at the connection, was more complicated to assemble and required a great deal of quality control to insure uniform electrical characteristics from one rectifier system to the next.

With the system of the present invention, a mounting and connection assembly has been evolved which eliminates or drastically reduces the aforementioned problems. In this system, the output connections for the main transformers are bussed by means of a standard bus bar and the output of each transformer is connected to a common support for all of the paralleled diodes for the particular phase involved. These latter bus bars or latter common supports are fluid cooled and provide an extremely simple and inexpensive mounting for the plurality of paralleled diode elements.

The paralleled interphase transformers are mounted in the central area defined by the six, in the case of a three-phase input supply, vertical diodes support elements. In the illustrated embodiment, the common sides of each of the input secondary windings are interconnected to three vertical common diode support assemblies and the opposite sides are interconnected with three other vertical diodes support assemblies, the first support assemblies being supported in a common plane and the second support assemblies lying in a second common plane, the two planes being spaced and parallel, one from the other.

The interphase transformer cores are mounted within the above-defined space and are supported relative to the vertical common supports by means of a pair of channels which are bolted together and squeezingly support the interphase transformer cores in vertical alignment. The required number of transformer core elements are stacked vertically and the conductors within the cores are mounted in a horizontal plane, the ends terminating in the space between the vertical common diode support elements and relatively proximate thereto.

A common diode connection for one side of all three phases, in the case of the three-phase system, is welded to the interphase transformer winding conductor and the diode elements are interconnected between the common support element on which they are mounted and the common connection element is welded to the respective interphase transformer winding.

With the system of the present invention, a relatively simplified bussing and support configuration has been provided which facilitates the assembly of the rectifier and further facilitates the inventory and the expansion and contraction of the voltage and current rating for the rectifier assembly. Further, the system of the present invention provides an improved method for more direct connection of the elements of the rectifier and eliminates the use of bolts in connecting the various electrical circuit elements together. Also, standardized conductors and core elements for the interphase transformer may be utilized and a standardized support element for all of the cores, irrespective of voltage or current ratings, are utilized in supporting the interphase transformer cores.

The standardized conductors described above are provided with a central cooling aperture through which a cooling medium is flowed, the cooling medium thus flowing through the central portion of the core and extracting heat from the core, a system which has not been previously utilized in systems of this type.

Accordingly, it is one object of the present invention to provide an improved rectifier system.

It is another object of the present invention to provide an improved support system for interphase transformers and rectifying elements utilized in a rectifying system.

It is still another object of the present invention to provide an improved system for bussing the electrical components of a rectifier system.

It is still another object of the present invention to provide an improved configuration for paralleling rectifying elements and interphase transformers.

It is still a further object of the present invention to provide an improved configuration for supporting paralleled rectifier diodes.

It is still a further object of the present invention to provide an improved system for interconnecting the center taps of interphase transformers.

It is still a further object of the present invention to provide an improved system for supporting transformers cores in interphase transformer systems.

It is a further object of the present invention to provide an improved system for assembling a plurality of interphase transformer cores.

It is still another object of the present invention to provide an improved system for bussing the plurality of rectifying devices in a multiphase system to interphase transformer windings.

It is still another object of the present invention to provide an improved system for cooling interphase transformer cores.

It is still a further object of the present invention to provide an improved system for supporting and bussing the various elements of a rectifier system including the bussing between the input main transformer and rectifying diodes, and rectifying diodes and the interphase transformers, and the interphase transformers and the output bus.

It is still a further object of the present invention to provide an improved support assembly for the various bussing elements of a rectifying system incorporating interphase transformers and rectifying devices.

It is still a further object of the present invention to provide an improved system for interconnecting the various electrical components of the system described above and substantially eliminating bolting elements for electrical connections.

It is still a further object of the present invention to reduce the number of insulators utilized in a rectifying system.

It is a further object of the present invention to provide an improved interphase assembly which permits the standardization of interphase transformer cores and conductors.

It is a further object of the present invention to provide an improved clamping device for supporting a plurality of paralleled interphase transformer cores.

It is still a further object of the present invention to provide an improved system for cooling both the conductors and cores of interphase transformers.

It is a further object of the present invention to provide an improved paralleled rectifying system incorporating interphase transformers which is inexpensive to manufacture, reliable in use and which minimizes the down time of the rectifier due to troubles or failures.

Further objects, features and advantages of this invention will become apparent from a consideration of the following description, the appended claims and the accompanying drawings in which:

FIG. 1 is a schematic diagram illustrating a typical multiphase rectifier system incorporating an interphase transformer system such as that described in U.S. Pat. No. 3,513,377;

FIG. 2 is a front view of a rectifier assembly in a cabinet with the door removed and incorporating certain features of the present invention;

FIG. 3 is a side view of the rectifier assembly of FIG. 2, the assembly of FIG. 3 being illustrated with the exterior cabinet panels removed to illustrate the diode mounting assemblies and main input transformers;

FIG. 4 is a plan view, partially in cross section, of the interphase transformer core and winding and further illustrating the interconnection between the interphase transformer winding and the rectifying diodes of the plural phase rectifying system;

FIG. 5 is an elevation view partially broken away of the interphase transformer assembly of FIG. 2 with the front control circuit boards and semicontrolled rectifier assemblies removed;

FIG. 6 is a side view of the interphase transformer assembly of FIG. 5;

FIG. 7 is a cross-sectional view of an interphase transformer core assembly, taken along line 7—7 of FIG. 5; and FIG. 8 is a composite schematic view of interphase transformer assemblies illustrating one and two interphase transformer cores to increase the voltage which may be accommodated by the interphase transformer.

Referring now to FIG. 1 there is illustrated a typical rectifying system 10, illustrated from the secondary windings 18 of a multiphase secondary windings 12, 14, 16 of a multiphase transformer to the output. The primary windings and the core of the main transformer are not illustrated, but it is understood that the typical primary windings and core are utilized.

The secondary windings 12, 14, 16 are center tapped, at 20, 22, 24 respectively, and the center-tap connections are connected together by a bus bar 26 to provide a common center-tap output connection at 28. The center-tap connection 28, in the illustrated embodiment, forms the positive terminal of the rectifying system.

Referring particularly to the first phase as generated across secondary winding 12, the left end of the winding 12 is interconnected with a common diode support heat sink 30 by means of a conductor 32. For purposes of this discussion, the use of the word conductor is generic to both a bus bar or an electrical wire except that it is to be understood that a bus bar is preferable. On the other hand, the right end of secondary winding 12 is interconnected with a second common diode support heat sink 34 by means of a second conductor 36. The heat sink 30 supports an "A" phase diode 38 which is connected to a common conductor 40 associated with one end of the winding of an interphase transformer assembly 44. A second diode 46 is supported in the diode bus assembly 34 and is interconnected with a second common conductor bus 50 associated with the other end of the winding of the interphase transformer 44.

In a similar fashion, "B" phase secondary winding 14 is connected to a second pair of diode support heat sinks 54, 56 by means of conductors 58, 60 respectively and a pair of diodes 62, 64 are supported on the respective heat sinks 54, 56. The diodes 62, 64 are also connected to the common conductors 40, 50 respectively. The third phase secondary winding 16 is connected with a third pair of common heat sink support assemblies 66, 68 by means of conductors 70, 72, the third pair of diodes 74, 76 being supported on the heat sinks 66, 68 respectively. Again, the diodes 74, 76 are connected to the common conductors 40, 50 respectively.

Referring particularly to the schematic of the interphase transformer 44, it is seen that the transformer includes an interphase winding 80 which is connected at one end to one common conductor 40 and at the other end to the other common conductor 50. The conductor 80 is passed through the center portion of a magnetic core 82 and thence to the connection at the common conductor 50. As will be seen from a description of FIGS. 2 to 8, the conductor 80 comprises a square conductor, preferably aluminum, with a center hole for supplying cooling fluid thereto, the conductor being bent to pass from the common conductor 40, through the core 82, to a center tap 86, around the outside of the core, and back to the other common conductor 50. The core 82 may be of the type commonly used in interphase transformers and is supported in a manner to be seen from a further description of FIGS. 2 to 8.

The circuit of FIG. 1 illustrates a single set of rectifying diodes in a single interphase transformer. However, when it is desired to parallel a second set of diodes in a second interphase transformer, the diodes are mounted in a second set of apertures 88 and includes the exact configuration of the diodes 38, 62, 74 and 46, 64, 76. Also, there is a second interphase transformer with a second set of common conductors 40 and 50 connected to the diodes. The center tap 86 of the interphase transformer 44 is connected with the center tap of the second interphase transformer to provide a common connection thereto and also a common connection to a negative output terminal 90, the terminals 28 and 90 forming the output terminals for the load being supplied. Also a further set of diode-supporting apertures 94 is provided to provide a third set of parallel diodes and a fourth set of apertures 96 are provided for a fourth set of rectifying diodes.

Referring now to FIGS 2 and 3, there is illustrated a typical rectifying system incorporating the features of the present invention. Specifically, the commercial source of power is connected to a plurality of transformers 100, 102, 104 which form a three-phase input system for the rectifier. The transformers are supported by means of a support channel assembly 106, the details of which are not critical to the present invention. As was stated above in connection with FIG. 1, the secondary windings of the transformers 100, 102, 104 are center tapped, the center tap being in the form of a common bus bar 108, which corresponds to the conductor 26 of FIG. 1, the common bus bar 108 being connected to an output bus 110 which forms the positive terminal for the load circuit.

As was stated above, the ends of the secondary winding are interconnected with the plurality of diode-mounting heat sink assemblies 30, 34, 54, 56, 66 and 68, the right side of the diode heat sink assemblies illustrated in FIG. 3 and the left side being directly behind the assemblies illustrated in FIG. 3. The conductors forming the connections between the ends of the transformer and the diode heat sink assemblies are formed by bus bars 112, 114, 116, the bus 112 being interconnected, by welding, with the diode heat sink assembly 34, the bus 114 being welded to the heat sink assembly 56 and the bus 116 being welded to the heat sink assembly 68. As is common in the art, the portions of the bus adjacent but not connected to the remaining diode heat sink support assemblies are provided with a sufficient space to avoid corona and short circuiting or are provided with insulating elements interposed therebetween.

Referring particularly to the details of the heat sink assemblies 34, 56, 68, the heat sinks are formed from an extruded aluminum channel having a generally flat web section 120 and a pair of fluid-conducting channels 122, 124 integrally extruded therewith. The central portion of the channels 122, 124 are hollow and provided with input and output fittings 128, 130 which are connected to a cooling fluid supply system (not shown) controlled either by a temperature-sensing or a condensate-sensing system. The condensate is sensed by means of a sensor assembly 136, the assembly controlling a solenoid which controls the flow of cooling fluid to the connections 128, 130. For further details of the condensate-sensing system, reference is made to copending application of Messrs. Minbiole and Mapham, Ser. No. 88,342, filed Nov. 10, 1970 for Condensate-Sensing System, the disclosure of which is incorporated herein by reference. The incoming channel 122 is interconnected with the outgoing channel 124 by means of a connecting conduit 138, all of the conduits being formed of suitable Nylon or other synthetic materials.

In the illustrated embodiment, two sets of parallel diodes are illustrated as being supported by the diode support assemblies 34, 56, 68, the reference numerals of FIG. 1 being applied to the corresponding elements for the first set of diodes 46, 64, 76 and the second set of diodes are illustrated at 140, 142, 144. Thus, current flows from the secondary of the upper transformer 100, through the conductor 112, to the diode bus assembly 34 through the diodes 46, 140. Similarly, current flows from the secondary of transformer 102, through the conductor 114, through the diode support assembly 56 to the diodes 64, 142 and, from the third transformer 104, through the conductor 116 to the third diodes 76, 144 through the third diode support assembly 68. Obviously, the description of the details of the diode support heat sink 34 also applies to the details of the diode support heat sink 56 and 68. The entire rectifier assembly is supported by a plurality of channels 150, 152, 154, 156, 158 and 160, as is common in the art.

In the front view of the rectifier assembly, illustrated in FIG 2, the interconnections between the diodes 46, 64, 76, 140, 142 144 are illustrated wherein the diode includes a connecting conductor 164 connected to the common conductor 50 welded to the winding 80 of the interphase transformer. Similarly, a pigtail 166 is provided with the diode 74 to be connected to the common conductor 40 by means of a bolt connection. Thus, current flows from the diodes 76, 74, and 144, in FIG. 2, to the respective windings 80 and a winding 170 of a parallel interphase transformer assembly 172. As will be seen from a further description of FIGS. 4 to 8, the windings 80 and 170 are center tapped by means of a common bus, this bus being best illustrated in FIGS. 5 and 6. The Bus is disposed generally vertically and appears at the top of FIG. 2 at 176. The ends of the bus bar 176 are bolted to a standard shunt resistor 180 and then to an output bus assembly 184 by means of a plurality of bolts.

The standard shunt 180 provides a voltage signal for the current-controlling circuits normally utilized in a rectifier system of this type, the circuits being illustrated in copending applications of James H. Galloway, Ser. No. 5,069, filed Jan. 22, 1970, for Peak Current Limiting System and a copending application of James H. Galloway, Ser. No. 88,340, filed Nov. 10, 1970, for Isolation and Transforming Circuit, the disclosures of which are incorporated herein by reference.

Obviously, the rectifier of the present invention is provided with the control circuits which are housed either in a panel mounted on the door of the rectifier assembly or are mounted in an area, designated by reference numeral 186, above the rectifier panel. Certain other sensing signals are provided, as for example by current transformers 188, 190, and 194, these latter signals sensing the current flowing in the incoming line before it is fed to the main transformer.

The current flowing in the primary winding of the main transformers 100, 102 and 104 are controlled by a plurality of controlled rectifier devices 198, 200 etc., which are connected, in any one phase, in parallel, back-to-back relation by means of a pair of pigtail conductors 202, 204 normally supplied with control devices of this type. The controlled rectifiers 198, 200 are mounted on T-shaped heat sink assemblies 206, 208 respectively which are, in turn, fastened to a main heat sink assembly 210 by means of a suitable heat-conducting, but electrically insulating, epoxy. The heat sink assembly 210 is generally of the same configuration as was described in conjunction with the heat sink assemblies 34, 56 and 68 with the exception that the semiconductor devices are supported by the epoxy. As was the case with heat sink assemblies 34, 56 and 68, suitable input connections 212 are provided for supplying cooling fluid thereto, the output being provided at connection 214. A connection between the tubular extruded apertures within the heat sink assembly 210 is provided by means of tubing 218.

The control rectifiers, for example 198 and 200 etc., are fired by a control, firing package housed in the area 186, the low voltage output signal from the firing package being supplied a plurality of pulse transformers 220, 224, 226 and 228. It will be noted that the pulse transformers 220 to 228 are positioned proximate all the controlled rectifiers 198, 200 to be fired thereby permitting a low voltage to be impressed on the conductors between the firing package in the area 186 and the pulse transformers 220 to 228. It will be noted that two pairs of controlled rectifiers are supported behind the circuit boards 230, 232 and the circuit boards supplying the firing pulse for controlled rectifiers 198 and 200 has been removed for clarity. The details of the controlled rectifier system, with the heat sink and T-bar support assemblies, are best illustrated and described in copending application of Lynn Zellmer, Ser. No. 88,322, filed Nov. 10, 1970, for Mounting Bracket for semiconductor Rectifiers to Heat Sinks, the disclosure which is incorporated herein by reference.

Referring now to FIGS. 4, 5 and 6, there are illustrated the specific details of the interphase transformer assembly and support therefor. In FIG. 4 there is illustrated a transformer including a core element 240 having a cross section such as that illustrated in FIG. 7. The central portion of the core is provided with a rectangular window adapted to receive the interphase winding 170 having a portion 242 which is connected to a lower common conductor 244. The lower common conductor is provided with a plurality of three apertures 246 for connection to the ends of a plurality of diode pigtails 248, 250 and 252.

The portion 242 of the conductor is welded along its edge thereof to the common conductor 244 and the conductor is provided with a right-angle bend to pass through the central portion of the core 240 at 250. The conductor is then given another right-angle bend such that a portion 252 is provided which is parallel to the portion 242 but spaced therefrom. The conductor again turns at a right angle to provide a central or a midpoint portion 254 to which a plurality of bus-bar conductors, in this case two conductors 258, 260 are attached. In the illustration of FIG. 4, a second pair of conductors 262, 264 are provided, these conductors being welded to the inside of conductor 260 to provide additional cross-sectional area for the combined current of the upper and lower interphase transformers, as will best be seen from a detailed description of FIGS. 5 and 6.

The conductor 170 then is given a right-angle bend parallel to and above the portion 242 and the conductor then turns at a right angle to pass through the core 240 and a second time with a portion 258. The last portion 260 of the conductor is welded to a second common conductor 262, the second portion 262 being parallel to but spaced from the common conductor 244.

The core 240 is squeezingly held between a pair of metallic channels 266, 268, the channels being held together solely by a plurality of bolt assemblies, including bolts 70, 272. This core support assembly for the core is best seen in FIGS. 5 and 6.

It is to be noted that FIG. 5 does not include all of the center-tap conductors described in conjunction with FIG. 4 but rather these conductors have been broken away. The channel elements 266, 268 support the core 240 and a second core 276 is supported immediately below the core 240 in vertical alignment therewith. The first core 240 is supported between the bolts 270, 272 and a second pair of bolts 278, 280. The second core 276 is supported between the bolts 278, 280 and a third pair of bolts 282, 284. Thus, the cores 240, 276 are supported between the two channels 266, 268, the only members engaging the cores, and the channels are held together by the plurality of bolts. The lower winding, which may correspond to the winding 80 of FIG. 1, is formed and supported in a manner identical to that described in conjunction with the description of the winding 170. It will be noted that the common conductors 262, 244 and 40, 50 do not lie in the same horizontal plane but rather are offset, one from the other, due to the vertical overlapping of the conductors 242, 260.

In looking at FIG. 7, it will be noted that the central portion of the conductor 170 is formed with a hollow aperture throughout the conductor to permit cooling fluid to be fed thereto from the same cooling source described above for cooling the entire rectifier and particularly the diode support heat sinks. The connections to the conductors 170 and 80 may be made in any suitable manner, this arrangement permitting the cooling of the central portion of the core 240.

The core 240 is fabricated by winding a strip of ferromagnetic material and the core is cut, at 290, to permit the positioning of the conductor portions 250, 258 in a central aperture 292. It will be noted that the conductors 80 and 170 are preformed and merely assembled with the core 240. The core 240 is then reassembled and a suitable strap is placed around the core to hold the core in its assembled state. The core assembly includes a pair of gaskets 296, 298 which are utilized to further support the core within the confines of the channels 266, 268 to prevent damage to the core when it is being squeezed and also to preclude electrical contact between the core assembly and the brackets 266, 268.

Referring back to FIGS. 3 and 6, it is seen that the conductors 258, 260, 262 and 264 form the center tap and bus conductor 176 described in conjunction with FIG. 2 and appearing at the upper left-hand portion of FIG. 3. It is to be noted that each time an additional core, for example core 240, is added to the core 276, an additional pair of vertical buses, for example 262, 264, are added to provide sufficient cross-sectional area to accommodate the additional current being carried in the bus 176 due to the added transformer.

From the description of FIGS. 4, 5 and 6, it is readily apparent that as many interphase transformers may be added as are needed for the number of diodes being paralleled, the addition of the cores and windings being made with ease and inexpensively. The additional windings are then interconnected with additional diodes on the diode support assemblies 34, 56, 68, 30, 54, 66 by means of the common conductors welded to the coil of the added interphase transformer.

Referring now to FIG. 8, there is illustrated a composite figure depicting a single-core interphase transformer or a double-core interphase transformer in the case of the lower portion of the figure. For example, the upper core 300 may be rated for 12 volts DC and the identical core may be utilized in the double configuration shown to provide 24 volt interphase transformer. Also, if desired, the number of windings or laminations on the core 300 may be varied to provide variation in voltages which may be utilized. Thus, for two sizes of core elements, four voltages may be provided as, for example 9, 12, 18 and 24 volts.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an electrical rectifier assembly which includes at least one diode in each phase of the secondary circuit of a main transformer, an interphase transformer assembly which comprises:
   a core element provided with a window therethrough;
   a pair of channel support members disposed on opposite sides of said core element, and including means for squeezing said core element therebetween;
   an interphase winding disposed through said window of said core element; and
   means for commonly connecting the at least one diode of each phase to said interphase winding.

2. The interphase transformer assembly, as set forth in claim 1, wherein said window in said core element is rectangularly shaped.

3. The interphase transformer assembly, as set forth in claim 1, wherein said means for squeezing said core elements is a plurality of bolt assemblies.

4. The interphase transformer assembly, as set forth in claim 1, wherein said interphase winding is formed with a hollow aperture therethrough.

5. The interphase transformer assembly, as set forth in claim 4, wherein heat is transferred from the core element by communicating a cooling fluid through said hollow aperture of said interphase winding.

6. The interphase transformer assembly, as set forth in claim 1, wherein said interphase winding is formed to define a rectangular shape having adjacent sides in 90° relationship, with said core being disposed at the mid point portion thereof.

7. The interphase transformer assembly, as set forth in claim 6, wherein a common conductor is connected to one side of said interphase windings, said common conductor connecting at least one diode in each phase of the secondary circuit.

8. In an electrical rectifier assembly which includes at least one diode in each phase of the secondary circuit of a main transformer, an interphase transformer assembly which comprises:
   a core element provided with a window therethrough;
   a hollow interphase winding disposed through said window of said core element;
   means for commonly connecting the at least one diode of each phase to said interphase winding; and
   means for cooling said core element from said winding by passing a cooling fluid through said hollow interphase winding.

9. The interphase transformer assembly, as set forth in claim 8, further including a pair of channel support members disposed on opposite sides of said core element, and including means for squeezing said core element therebetween.

10. The interphase transformer assembly, as set forth in claim 9, wherein said means for squeezing said core elements is a plurality of bolt assemblies.

11. The interphase transformer assembly, as set forth in claim 8, wherein said interphase winding is formed to define a rectangular shape having adjacent sides in 90° relationship, with said core being disposed at the mid point portion thereof.

12. The interphase transformer assembly, as set forth in claim 11, wherein a common conductor is connected to one side of said interphase windings, said common conductor connecting at least one diode in each phase of the secondary circuit.

13. The interphase transformer assembly as set forth in claim 1, further including a second transformer assembly having a core element provided with a window therethrough, a second interphase winding disposed through said window of said core element, a second set of at least one diode in each phase of the secondary circuit of the main transformer, means for connecting said first and second set of diodes in parallel with said main transformer, means for commonly connecting the second set of diodes of each phase to said second interphase winding, the core element of said first interphase transformer and the core element of said second interphase transformer being commonly supported by said channel support members.

14. The improvement of claim 13, wherein said cores are vertically supported, one above the other.

15. The improvement of claim 14, wherein said first and second interphase windings include a center tap for each winding, and means for commonly connecting said first and second center taps.

16. The interphase transformer assembly as set forth in claim 8, further including a second transformer assembly having a core element provided with a window therethrough, a second interphase winding disposed through said window of said core element, a second set of at least one diode in each phase of the secondary circuit of the main transformer, means for connecting said first and second set of diodes in parallel with said main transformer, means for commonly connecting the second set of diodes of each phase to said second interphase winding, the core element of said first interphase transformer and the core element of said second interphase transformer being commonly supported by said channel support members.

17. The improvement of claim 16, wherein said cores are vertically supported, one above the other.

18. The improvement of claim 17, wherein said first and second interphase windings include a center tap for each winding, and means for commonly connecting said first and second center taps.

* * * * *